United States Patent
Choi et al.

(10) Patent No.: US 8,861,325 B2
(45) Date of Patent: Oct. 14, 2014

(54) METHOD FOR CONFIGURING SUBCHANNELS IN WIRELESS COMMUNICATION SYSTEM AND APPARATUS THEREFOR

(75) Inventors: Jin Soo Choi, Anyang-si (KR); Han Gyu Cho, Anyang-si (KR); Jin Sam Kwak, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 164 days.

(21) Appl. No.: 13/514,228

(22) PCT Filed: Jan. 25, 2011

(86) PCT No.: PCT/KR2011/000508
§ 371 (c)(1),
(2), (4) Date: Jun. 6, 2012

(87) PCT Pub. No.: WO2011/093632
PCT Pub. Date: Aug. 4, 2011

(65) Prior Publication Data
US 2012/0300719 A1 Nov. 29, 2012

Related U.S. Application Data

(60) Provisional application No. 61/300,005, filed on Jan. 31, 2010, provisional application No. 61/300,031, filed on Feb. 1, 2010, provisional application No. 61/300,447, filed on Feb. 2, 2010, provisional application No. 61/305,145, filed on Feb. 17, 2010.

(51) Int. Cl.
| | | |
|---|---|---|
| H04J 11/00 | (2006.01) | |
| H04W 4/00 | (2009.01) | |
| H04J 1/00 | (2006.01) | |
| H04B 1/38 | (2006.01) | |
| H04K 1/10 | (2006.01) | |
| H04W 72/00 | (2009.01) | |
| H04L 5/00 | (2006.01) | |

(52) U.S. Cl.
CPC ............. *H04L 5/0037* (2013.01); *H04L 5/0007* (2013.01); *H04L 5/0039* (2013.01)
USPC ........... 370/203; 370/329; 370/343; 375/219; 375/260; 455/450; 455/509; 455/561

(58) Field of Classification Search
USPC .......... 370/329, 203, 343; 375/219, 295, 260; 455/450, 509, 561
See application file for complete search history.

(56) References Cited

U.S. PATENT DOCUMENTS 8,059,744 B2 * 11/2011 Jin et al. ........................ 375/267
2008/0123759 A1    5/2008 Oh et al.

(Continued)

OTHER PUBLICATIONS

Kim Taeyoung, Nov. 3, 2008, IEEE 802.16m-08/1464, "Proposed Text of DL Subchannelization for the IEEE 802.16m Amendment", p. 1-9.*

(Continued)

*Primary Examiner* — Alpus H Hsu
*Assistant Examiner* — Camquyen Thai
(74) *Attorney, Agent, or Firm* — Birch, Stewart, Kolasch & Birch, LLP

(57) ABSTRACT

A method for configuring subchannels for an uplink data transmission at a base station in a wireless communication system is disclosed herein. More specifically, the method includes the steps of dividing an uplink transmission resource to PUSC (Partial Usage of SubChannel) tiles of 4 subcarriers×3 symbols, configuring subchannels to 6 PUSC tiles based on a predetermined rule; allocating a predetermined number of contiguous subchannels among the configured subchannels as subchannels for a legacy system, and allocating the remaining subchannels as subchannels for the wireless communication system, wherein a subchannel rotation per slot consisting of 3 symbols is applied to the subchannels for the legacy system, and wherein the subchannel rotation per slot is based on a number of subchannels for the legacy system.

7 Claims, 10 Drawing Sheets

(56) References Cited

U.S. PATENT DOCUMENTS

| | | |
|---|---|---|
| 2009/0197599 A1 | 8/2009 | Cho et al. |
| 2009/0262671 A1 | 10/2009 | Seol et al. |
| 2009/0268679 A1* | 10/2009 | Suga ............................ 370/329 |
| 2009/0323614 A1* | 12/2009 | Wang et al. ................... 370/329 |
| 2010/0085866 A1* | 4/2010 | Li et al. ........................ 370/208 |
| 2010/0278221 A1* | 11/2010 | QI et al. ........................ 375/219 |
| 2011/0019622 A1* | 1/2011 | Lee et al. ...................... 370/328 |

OTHER PUBLICATIONS

Seol, Ji-Yun, Apr. 4, 2008, IEEE 802.16m-08/180r1, "UL Burst Allocation for F-FDD MS in Generic H-FDD Frame Structuret".*

* cited by examiner

US 8,861,325 B2

METHOD FOR CONFIGURING SUBCHANNELS IN WIRELESS COMMUNICATION SYSTEM AND APPARATUS THEREFOR

This application is the National Phase of PCT/KR2011/000508 filed on Jan. 25, 2011 which claims priority under 35 U.S.C. 119(e) to the U.S. Provisional Application Nos. 61/300,005 filed on Jan. 31, 2010, 61/300,031 filed on Feb. 1, 2010, 61/300,447 filed on Feb. 2, 2010 and 61/305,145 filed on Feb. 17, 2010, all of which are hereby expressly incorporated by reference into the present application.

TECHNICAL FIELD

The present invention relates to a wireless communication system and, more particularly to a method for configuring subchannels in a wireless communication system and an apparatus therefor.

BACKGROUND ART

FIG. 1 illustrates an exemplary wireless communication system. Referring to FIG. 1, a wireless communication system includes a plurality of base stations 110 and a plurality of user equipments (or user terminals) 120. The wireless communication system 100 may include a homogeneous network or a heterogeneous network. Herein, the heterogeneous network refers to a network having different network entities, such as an IEEE (Institute of Electrical and Electronics Engineers) 802.16e system, an IEEE 802.16m system, a 3GPP LTE (Long Term Evolution) system, a WIFI system, and so on, co-existing therein. Furthermore, the homogeneous network may be categorized as a macro cell, a Femto cell, a Pico cell, a relay station, and so on. A base station generally corresponds to a fixed station that communicates with a user equipment. Herein, each base station (110a, 110b, and 110c) provides a service to specific geological regions (102a, 102b, and 102c). In order to enhance the system performance, the specific geological region may be segmented to a plurality of smaller regions (104a, 104b, and 104c). Each of the smaller regions may be referred to as a cell, a sector, or a segment. In case of the IEEE (Institute of Electrical and Electronics Engineers) 802.16 system, a cell identifier (or cell identity) is assigned with respect to the entire system. Conversely, a sector or segment identifier is assigned with respect to the specific region to which each base station provides the corresponding service. Herein, the sector or segment identifier is given a value of 0 to 2. The user equipment 120 is generally distributed in the wireless communication system, and, herein, the user equipment 120 may be fixed or mobile. Each user equipment may communicate with one or more base stations via uplink and downlink at a random instant. The base station and the user equipment may communicate with one another by using a Frequency Division Multiple Access (FDMA), a Time Division Multiple Access (TDMA), a Code Division Multiple Access (CDMA), a Single Carrier-FDMA (SC-FDMA), a Multi Carrier-FDMA (MC-FDMA), an Orthogonal Frequency Division Multiple Access (OFDMA), or by using a combination of two or more of the above-mentioned access methods. In the description of the present invention, an uplink refers to a communication link from the user equipment to the base station, and a downlink refers to a communication link from the base station to the user equipment.

DISCLOSURE

Technical Problem

An object of the present invention is to provide a method for configuring subchannels in a wireless communication system and an apparatus therefor.

Additional technical objects of the present application will be set forth in part in the description which follows and in part will become apparent to those having ordinary skill in the art upon examination of the following or may be learned from practice of the present application.

Technical Solution

In an aspect of the present invention, a method for configuring subchannels for an uplink data transmission at a base station in a wireless communication system includes the steps of dividing an uplink transmission resource to PUSC (Partial Usage of SubChannel) tiles of 4 subcarriers×3 symbols; configuring subchannels to 6 PUSC tiles based on a predetermined rule; allocating a predetermined number of contiguous subchannels among the configured subchannels as subchannels for a legacy system, and allocating the remaining subchannels as subchannels for the wireless communication system, wherein a subchannel rotation per slot consisting of 3 symbols is applied to the subchannels for the legacy system, and wherein the subchannel rotation per slot is based on a number of subchannels for the legacy system.

In another aspect of the present invention, a base station includes a processor allocating resource for an uplink data transmission; a transmitting module transmitting information on the allocated resource to a user equipment; and a receiving module receiving the uplink data from the user equipment through the allocated resource, wherein the processor divides an uplink transmission resource to PUSC (Partial Usage of SubChannel) tiles of 4 subcarriers×3 symbols, configures subchannels to 6 PUSC tile based on a predetermined rule, allocates a predetermined number of contiguous subchannels among the configured subchannels as subchannels for a legacy system, and allocates the remaining subchannels as subchannels for the wireless communication system, and wherein a subchannel rotation per slot consisting of 3 symbols is applied to the subchannels for the legacy system, and wherein the subchannel rotation per slot is based on a number of subchannels for the legacy system.

Herein, the number of subchannels for the legacy system may be signaled to a legacy user equipment through a UCD (Uplink Channel Descriptor) message.

It is preferable that a subchannel rotation per subframe is applied to the subchannels for the wireless communication system. And, in this case, it is preferable that the subchannel rotation per subframe is performed based on a number of subchannels for the wireless communication system.

Meanwhile, the subchannels for the wireless communication system are signaled as zones to which the subchannel rotation per slot is not applied, to a legacy user equipment through a UIUC (uplink interval usage code) included in an uplink MAP.

Also, the subchannel rotation per slot may be performed in accordance with Equation 1 shown below.

$$\text{temp2\_subchannel\_number} = (\text{temp1\_subchannel\_number} + 13 * S_{idx}) \bmod N_{subchannel\ for\ 16eMS} \quad \text{<Equation 1>}$$

(Herein, temp2_subchannel represents a subchannel index after the subchannel rotation is applied, temp1_subchannel represents a subchannel index before the subchannel rotation is applied, $S_{idx}$ represents a slot index, and $N_{subchannel\,for\,16e\,AMS}$ represents a number of subchannels for the legacy system.)

Meanwhile, the subchannel rotation per subframe may be performed in accordance with Equation 2 shown below.

temp2_subchannel_number=
(temp1_subchannel_number+13*$S_k$)mod
$N_{subchannel\,for\,16m\,AMS}$  <Equation 2>

(Herein, temp2_subchannel represents a subchannel index after the subchannel rotation is applied, temp1_subchannel represents a subchannel index before the subchannel rotation is applied, $S_k$ represents a subframe index, and $N_{subchannel\,for\,16m\,AMS}$ represents a number of subchannels for the wireless communication system.)

Advantageous Effects

According to the embodiments of the present invention, in a wireless communication system, the base station may be capable of more efficiently configuring subchannels for performing uplink data transmission.

Additional effects or advantages of the present application will be set forth in part in the description which follows and in part will become apparent to those having ordinary skill in the art upon examination of the following or may be learned from practice of the present application.

DESCRIPTION OF DRAWINGS

The accompanying drawings, which are included to provide a further understanding of the invention and are incorporated in and constitute a part of this application, illustrate embodiment(s) of the invention and together with the description serve to explain the principle and technical spirit of the invention.

MODE FOR INVENTION

The structure, operation, and other characteristics of the present invention may be easily understood based upon the preferred embodiments of the present invention, which will hereinafter be described in detail with reference to the accompanying drawings. Hereinafter, the embodiments of the present invention described below correspond to examples of the technical characteristics of the present invention being applied to a system using a plurality of orthogonal subcarriers. Although the description of the present invention is made with respect to the IEEE 802.16 system for simplicity, the present invention may also be applied to various types of wireless communication systems including a 3GPP (3rd Generation Partnership Project) system.

Figure 1:
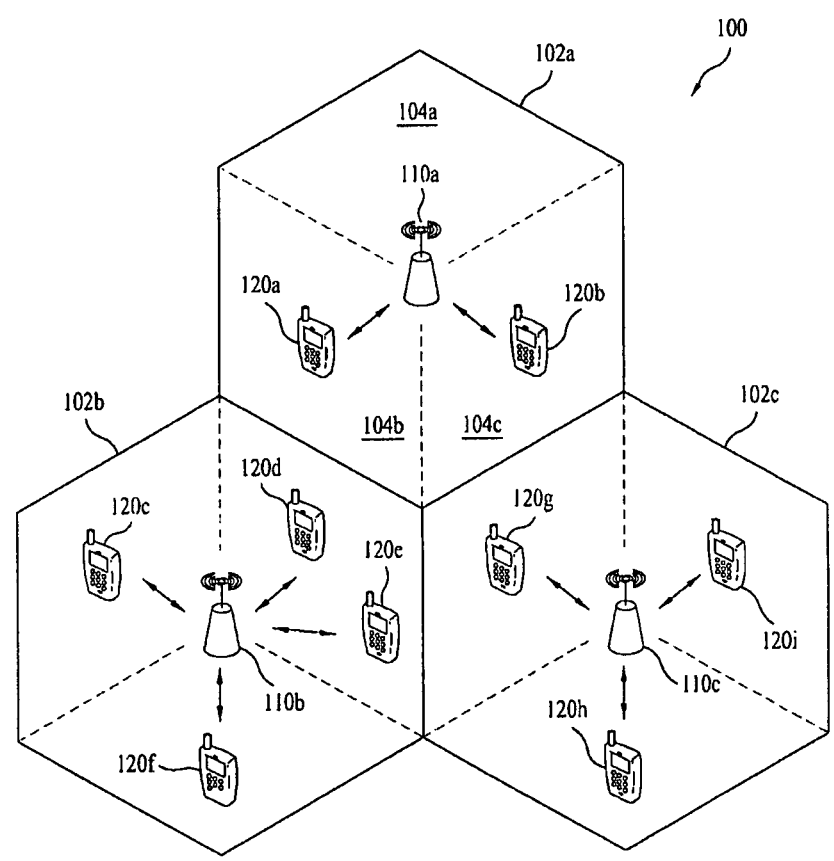
FIG. 1 illustrates an exemplary wireless communication system.
Figure 2:
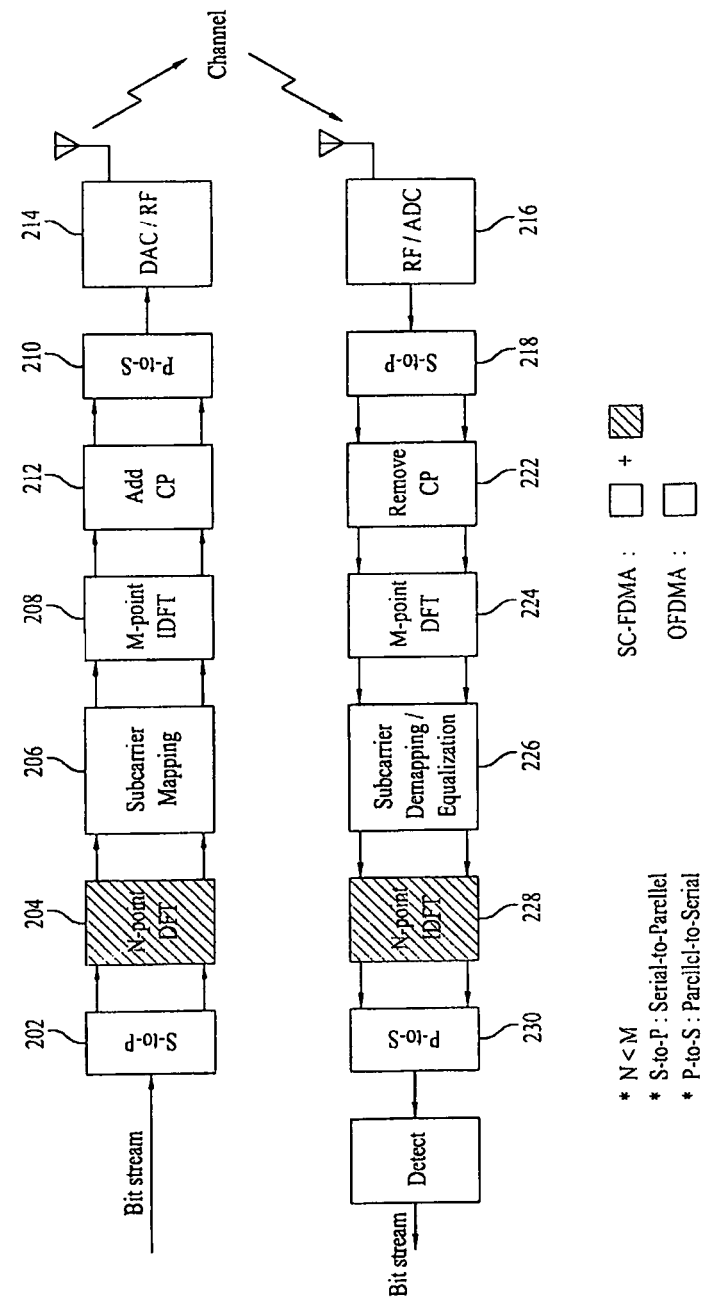
FIG. 2 illustrates a block view showing an exemplary transmitter and an exemplary receiver for OFDMA and SC-FDMA.

FIG. 2 illustrates a block view showing an exemplary transmitter and an exemplary receiver for OFDMA and SC-FDMA. In an uplink, the transmitter may correspond to a portion of the user equipment, and the receiver may correspond to a portion of the base station. In a downlink, the transmitter may correspond to a portion of the base station, and the receiver may correspond to a portion of the user equipment.

Referring to FIG. 2, an OFDMA transmitter includes a Serial to Parallel converter (202), a subcarrier mapping module (206), an M-point Inverse Discrete Fourier Transform (IDFT) module (208), a Cyclic prefix (CP) adding module (210), a Parallel to Serial converter (212), and an RF (Radio Frequency)/DAC (Digital to Analog Converter) module (214).

The signal processing procedure of the OFDMA transmitter will now be described. First of all, a bit stream is modulated to a data stream sequence. Herein, a bit stream may be obtained by performing diverse signal processing steps, such as channel encoding, interleaving, scrambling, and so on, on a data block received from a Medium Access Control (MAC) layer. The bit stream is also referred to as a codeword and is the equivalent of a data block received from the MAC layer. The data block received from the MAC layer is also referred to as a transmission block. Herein, the modulation method may include BPSK (Binary Phase Shift Keying), QPSK (Quadrature Phase Shift Keying), and n-QAM (Quadrature Amplitude Modulation). Thereafter, each set of N number of data symbols in the serial data symbol sequence is parallel converted (202). The N number of data symbols is mapped to N number of assigned subcarriers among the total of M number of subcarriers. Then, the remaining M-N number of subcarriers is padded with 0s (206). The data symbols mapped to the frequency domain are converted to a time domain sequence through an M-point IDFT processing step (208). Thereafter, in order to reduce the interference with between symbols and the interference between carriers, a cyclic prefix is added to the time domain sequence, so as to create (or generate) an OFDMA symbol (210). The created PFDMA symbol is then converted from a parallel symbol to a serial symbol (212). Subsequently, the OFDMA symbol is processed with digital-to-analog conversion, frequency up-conversion, and so on, thereby being transmitted to the receiver (214). Another user is assigned with an available subcarrier among the remaining M-N subcarriers. Conversely, the OFDMA receiver includes an RF/ADC (Analog to Digital Converter) module (216), a serial to parallel converter (218), a Remove CP module (220), an M-point Discrete Fourier Transform (DFT) module (224), a subcarrier demapping/equalization module (226), a parallel to serial converter (228), and a detection module (230). Herein, the signal processing procedure of the OFDMA receiver is configured of an inverse procedure of the OFDMA transmitter.

Meanwhile, as compared to the OFDMA transmitter, an SC-FDMA transmitter additionally includes an N-point DFT module (204) before the subcarrier mapping module (206).

The SC-FDMA transmitter disperses multiple data sets throughout the frequency domain via DFT prior to the IDFT process. Accordingly, the SC-FDMA transmitter may largely reduce a PAPR (Peak-to-Average Power Ratio) of the transmission signal as compared to the OFDMA method. Also, as compared to the OFDMA receiver, an SC-FDMA receiver additionally includes an N-point IDFT module (228) after the subcarrier demapping module (226). Herein, the signal processing procedure of the SC-FDMA receiver is configured of an inverse procedure of the SC-FDMA transmitter.

The module described with reference to FIG. 2 is merely exemplary. And, therefore, the transmitter and/or the receiver may further include additional module whenever required. Furthermore, some of the modules/functions may be omitted or may be divided into separate modules. Alternatively, two or more modules may also be integrated as a single module.

Figure 3:
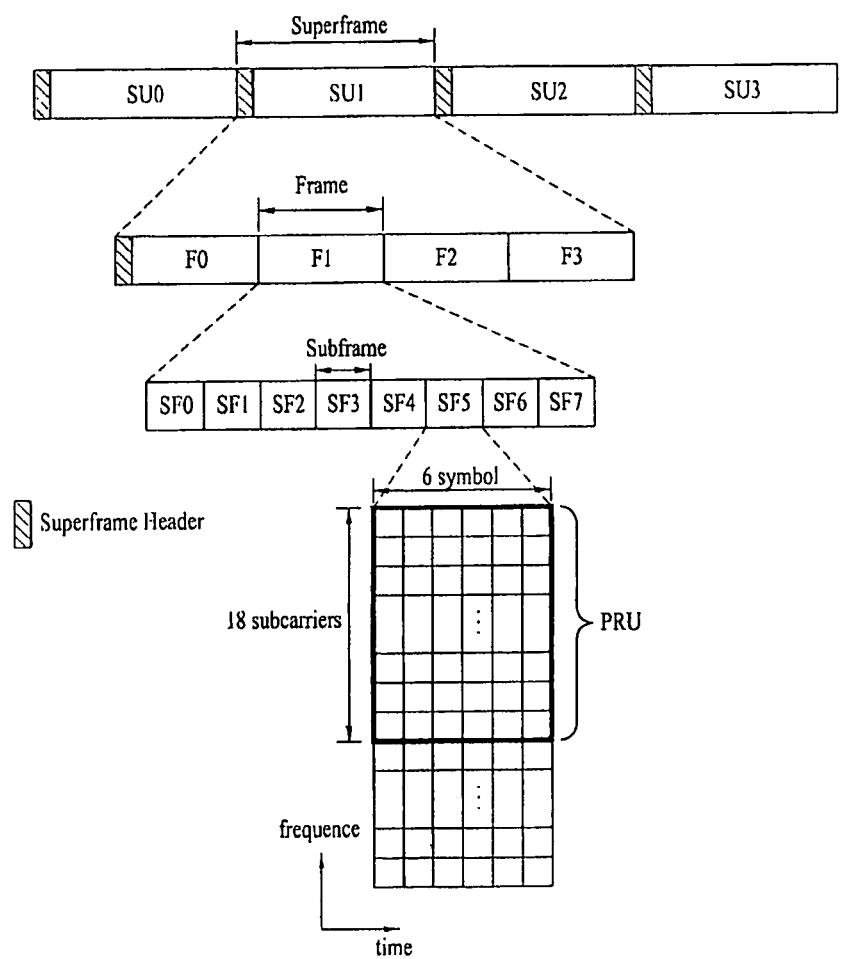
FIG. 3 illustrates an exemplary wireless frame structure of an IEEE 802.16m system.

FIG. 3 illustrates an exemplary wireless frame structure of an IEEE 802.16m system.

Referring to FIG. 3, a wireless frame structure includes a 20 ms superframe (SU0-SU3) supporting bandwidths of 5 MHz, 8.75 MHz, 10 MHz, or 20 MHz. Herein, the superframe includes 4 5 ms frames (F0-F3) each having the same size, and the superframe begins with a Super Frame Header (SFH). The super frame header carries (or delivers) an essential system parameter and system configuration information.

A frame includes 8 subframes (SF0-SF7). The subframes are assigned for downlink or uplink transmission. Herein, a subframe includes a plurality of OFDM symbols in the time domain and includes a plurality of subcarriers in the frequency domain. Depending upon the multiple access method, the OFDM symbol may also be referred to as an OFDMA symbol, an SC-FDMA symbol, and so on. The number of OFDM symbols included in a subframe may vary diversely depending upon the channel bandwidth, the length of the cyclic prefix, and so on.

The type of a subframe may be defined with respect to the number of OFDM symbols included in the subframe. For example, a subframe including 6 OFDM symbols may be defined as a Type-1 subframe, a subframe including 7 OFDM symbols may be defined as a Type-2 subframe, a subframe including 5 OFDM symbols may be defined as a Type-3 subframe, and a subframe including 9 OFDM symbols may be defined as a Type-4 subframe. Herein, one frame may include subframes each corresponding to the same subframe type, or one frame may include subframes each corresponding to a different subframe type.

Most particularly, the Type-4 subframe including 9 OFDM symbols is applied only to an uplink subframe corresponding to when a WirelessMAN-OFDMA frame having a channel bandwidth of 8.75 MHz is supported in an IEEE 802.16e system.

Figure 4:
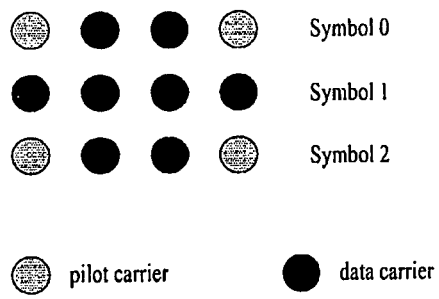
FIG. 4 illustrates tile and pilot structures of the related art IEEE 802.16e system (WirelessMAN-OFDMA system).

FIG. 4 illustrates tile and pilot structures of the related art IEEE 802.16e system (WirelessMAN-OFDMA system).

The current IEEE 802.16e system includes tile and pilot structures shown in FIG. 4 as the respective uplink PUSC (Partial Usage of SubChannel) structure. Herein, the uplink PUSC basic unit is configured of 4 subcarriers×3 OFDM(A) symbols, and one subchannel is configured of 6 tiles.

Most particularly, FIG. 4 corresponds to a case wherein only one transmitting antenna is taken into account. The above-described uplink PUSC basic unit structure has 33.33% of the pilot overhead. As shown in FIG. 4, pilot and data carriers respectively indicate resource elements (REs) each having a pilot and data assigned thereto. Each of the resource element (RE) represents a time-frequency resource that is being defined by an OFDM(A) symbol and a subcarrier. In the description of the present invention, a "pilot (sub) carrier" and a "data (sub)carrier" may also be referred to as a "pilot RE" and a "data RE".

Figure 5:
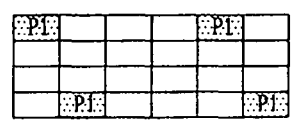
FIG. 5 illustrates an example of assigning 1 Tx or 1 stream pilot, when an uplink basic unit is configured of 4 subcarriers×6 OFDM(A) symbols in the current IEEE 802.16m system.

FIG. 5 illustrates an example of assigning 1 Tx or 1 stream pilot, when an uplink basic unit is configured of 4 subcarriers×6 OFDM(A) symbols in the current IEEE 802.16m system.

Referring to FIG. 5, in a basic unit configured of 4 subcarriers×6 OFDM(A) symbols, the position of the pilot RE is as follows: when the symbol index is 0, the subcarrier index is 0, when the symbol index is 1, the subcarrier index is 3, when the symbol index is 4, the subcarrier index is 0, and when the symbol index is 5, the subcarrier index is 3.

Figure 6:
FIG. 6 illustrates an example of assigning 2 Tx or 2 stream pilots, when an uplink basic unit is configured of 4 subcarriers×6 OFDM(A) symbols in the current IEEE 802.16m system.

FIG. 6 illustrates an example of assigning 2 Tx or 2 stream pilots, when an uplink basic unit is configured of 4 subcarriers×6 OFDM(A) symbols in the current IEEE 802.16m system.

Referring to FIG. 6, in a basic unit configured of 4 subcarriers×6 OFDM(A) symbols, 2 Tx or 2 stream pilots are assigned to each antenna port in pairs. Herein, the position of the pilot RE for antenna port 0 is as follows: when the symbol index is 0, the subcarrier index is 0, and when the symbol index is 5, the subcarrier index is 3. Also, the position of the pilot RE for antenna port 1 is as follows: when the symbol index is 0, the subcarrier index is 3, and when the symbol index is 5, the subcarrier index is 0. Herein, the above-described antenna ports may be switched with one another.

Meanwhile, in the IEEE 802.16m, the OFDM symbol includes a plurality of subcarriers, and the number of subcarriers is decided based upon the size of a FFT (Fast Fourier Transform). The subcarrier types may be categorized as a data subcarrier for data transmission, a pilot subcarrier for channel measurement, and a null subcarrier for a guard band and a DC element. The parameters characterizing the OFDM symbol correspond to BW, $N_{used}$, n, G, and so on. Herein, BW is a nominal channel bandwidth. $N_{used}$ represents the number of subcarriers that are used in the signal transmission. N represents a sampling factor, which decides subcarrier spacing and useful symbol time along with the BW and the $N_{used}$. G signifies the ratio between the CP time and the useful time.

Table 1 shows examples of the OFDMA parameters.

TABLE 1

| | | | | | | |
|---|---|---|---|---|---|---|
| The nominal channel bandwidth, BW (MHz) | | 5 | 7 | 8.75 | 10 | 20 |
| Sampling factor, n | | 28/25 | 8/7 | 8/7 | 28/25 | 28/25 |
| Sampling frequency, $F_s$ (MHz) | | 5.6 | 8 | 10 | 11.2 | 22.4 |
| FFT size, $N_{FFT}$ | | 512 | 1024 | 1024 | 1024 | 2048 |
| Subcarrier spacing, $\Delta f$ (kHz) | | 10.94 | 7.81 | 9.77 | 10.94 | 10.94 |
| Useful symbol time, $T_b$ (µs) | | 91.4 | 128 | 102.4 | 91.4 | 91.4 |
| CP ratio, G = 1/8 | OFDMA symbol time, $T_s$ (µs) | 102.857 | 144 | 115.2 | 102.857 | 102.857 |
| | FDD Number of OFDMA symbols | 48 | 34 | 43 | 48 | 48 |

TABLE 1-continued

|  |  |  |  |  |  |  |
|---|---|---|---|---|---|---|
|  |  | per 5 ms frame |  |  |  |  |
|  |  | Idle time (μs) | 62.857 | 104 | 46.40 | 62.857 | 62.857 |
|  | TDD | Number of OFDMA symbols per 5 ms frame | 47 | 33 | 42 | 47 | 47 |
|  |  | TTG + RTG (μs) | 165.714 | 248 | 161.6 | 165.714 | 165.714 |
| CP ratio, G = 1/16 | OFDMA symbol time, $T_s$ (μs) |  | 97.143 | 136 | 108.8 | 97.143 | 97.143 |
|  | FDD | Number of OFDMA symbols per 5 ms frame | 51 | 36 | 45 | 51 | 51 |
|  |  | Idle time (μs) | 45.71 | 104 | 104 | 45.71 | 45.71 |
|  | TDD | Number of OFDMA symbols per 5 ms frame | 50 | 35 | 44 | 50 | 50 |
|  |  | TTG + RTG (μs) | 142.853 | 240 | 212.8 | 142.853 | 142.853 |
| CP ratio, G = 1/4 | OFDMA symbol time, $T_s$ (μs) |  | 114.286 | 160 | 128 | 114.286 | 114.286 |
|  | FDD | Number of OFDMA symbols per 5 ms frame | 43 | 31 | 39 | 43 | 43 |
|  |  | Idle time (μs) | 85.694 | 40 | 8 | 85.694 | 85.694 |
|  | TDD | Number of OFDMA symbols per 5 ms frame | 42 | 30 | 38 | 42 | 42 |
|  |  | TTG + RTG (μs) | 199.98 | 200 | 136 | 199.98 | 199.98 |
| Number of Guard Sub-Carriers | Left |  | 40 | 80 | 80 | 80 | 160 |
|  | Right |  | 39 | 79 | 79 | 79 | 159 |
| Number of Used Sub-Carriers |  |  | 433 | 865 | 865 | 865 | 1729 |
| Number of Physical Resource Unit (18 × 6) in a type-1 sub-frame. |  |  | 24 | 48 | 48 | 48 | 96 |

A subframe includes a plurality of Physical Resource Units (hereinafter referred to as PRUs) in the frequency domain. The PRU corresponds to the basic unit for assigning (or allocating) resources. More specifically, in the time domain, the PRU consists of a plurality of successive (or contiguous) OFDM symbols, and in the frequency domain, the PRU consists of a plurality of successive (or contiguous) subcarriers. For example, the number of OFDM symbols included in the PRU may be identical to the number of OFDM symbols included in a subframe. Accordingly, the number of OFDM symbols included in the PRU may be decided based upon the subframe type. Meanwhile, the number of subcarriers included in the PRU may be equal to 18. In this case, the PRU may be configured of 6 OFDM symbols×18 subcarriers. Depending upon the resource assignment (or allocation) method, the PRU may also be referred to as a Distributed Resource Unit (hereinafter referred to as DRU) or a Contiguous Resource Unit (hereinafter referred to as CRU).

The above-described structure is merely exemplary. Therefore, the corresponding structure may diversely vary depending upon the length of the superframe, the number of frames included in the superframe, the number of subframes included in a frame, the number of OFDMA symbols included in a subframe, the parameter of an OFDMA symbol, and so on. For example, the number of subframes included in a frame may diversely vary depending upon the channel bandwidth, the length of a CP (cyclic prefix), and so on.

Figure 7:
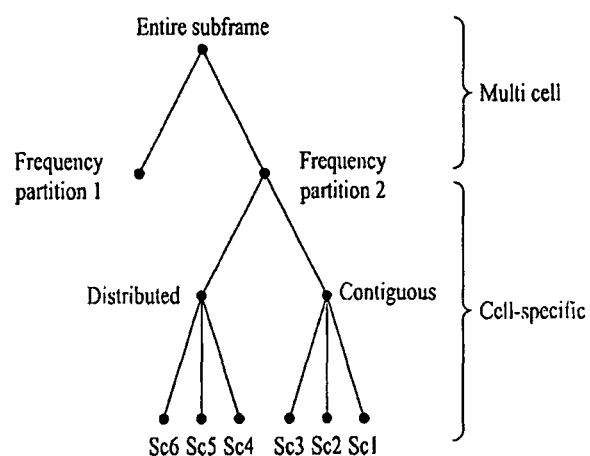
FIG. 7 illustrates an exemplary physical structure of a subframe in an IEEE 802.16m system.

FIG. 7 illustrates an exemplary physical structure of a subframe in an IEEE 802.16m system.

Referring to FIG. 7, a subframe may be divided into at least one Frequency Partition (FP). Although it is shown in FIG. 7 that the subframe is divided into 2 frequency partitions, the number of frequency partitions will not be limited only to the example presented herein.

Each frequency partition includes one or more PRUs. Herein, a distributed resource allocation method and/or a contiguous resource allocation method may be applied to each frequency partition.

A Logical Resource Unit (LRU) corresponds to a basic logical unit for the distributed resource allocation method and the contiguous resource allocation method. An LDRU (Logical Distributed Resource Unit) includes a plurality of subcarriers distributed within the frequency band. Herein, the size of the LDRU is identical to the size of the PRU. The LDRU may also be referred to as a Distributed LRU (DLRU). An LCRU (Logical Contiguous Resource Unit) includes contiguous subcarriers. Herein, the size of the LCRU is also identical to the size of the PRU. The LCRU may also be referred to as a Contiguous LRU (CLRU).

Figure 8:
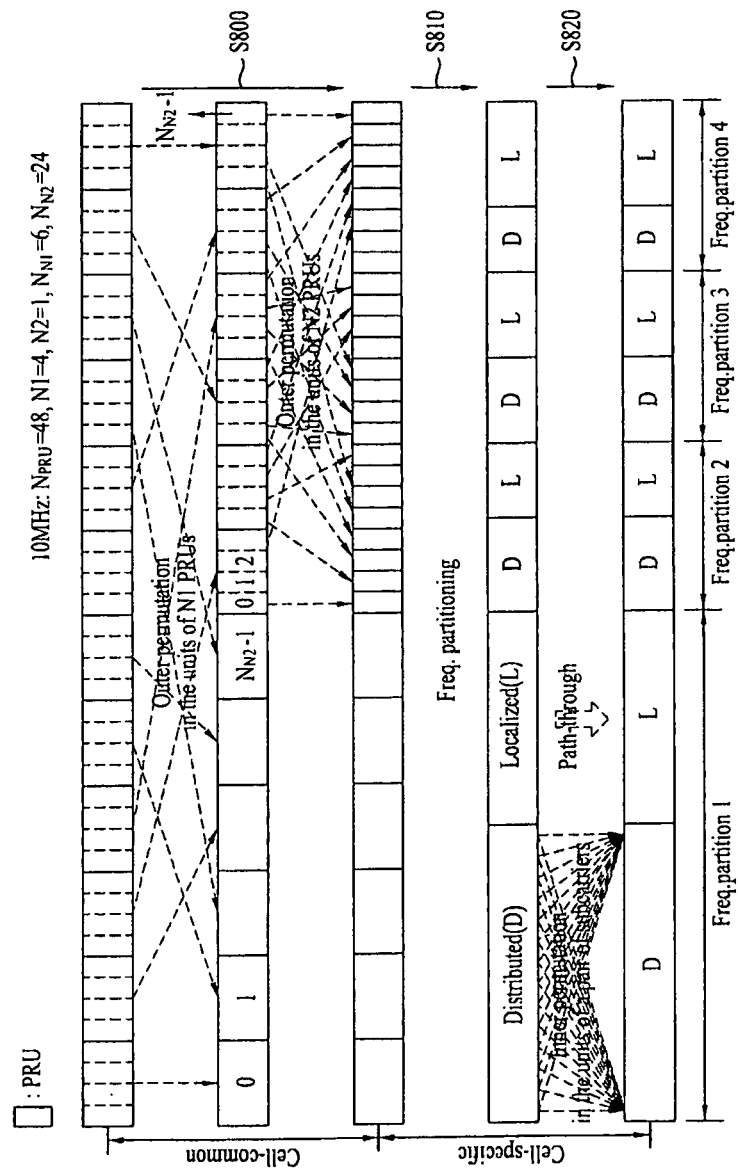
FIG. 8 illustrates an exemplary procedure for mapping a resource unit in the IEEE 802.16m system.

FIG. 8 illustrates an exemplary procedure for mapping a resource unit in the IEEE 802.16m system. Most particularly, for simplicity of the description, FIG. 8 shows an example wherein the overall frequency band is 10 MHz, wherein the total number of PRUs is equal to 48, wherein $N_1$=4, wherein the number of sub-bands having the granularity of $N_1$ (i.e., $N_{N1}$) is equal to 6, wherein $N_2$=1, and wherein the number of mini-bands having the granularity of $N_2$ (i.e., $N_{N2}$) is equal to 24.

Referring to FIG. 8, the PRUs of the physical domain may be divided into sub-band PRUs or mini-band PRUs, which correspond to a logical domain, through an outer permutation with $N_1$ granularity, and an outer permutation with $N_2$ granularity may be performed on a mini-band PRU (S800). More specifically, it may be understood that the outer permutation of step S800 is divided into a step of performing sub-band partitioning for dividing the PRUs of the physical domain into sub-band PRUs or mini-band PRUs, which correspond to the logical domain, and a step of performing mini-band permutation for acquiring a diversity gain of the mini-band PRUs.

Then, the sub-band PRUs or the mini-band PRUs are distributed to each frequency partition, and a process of differentiating contiguous resource (L) and distributed resource (D) within each frequency partition is performed (S810). The step of distributing the sub-band PRUs or the mini-band PRUs to each frequency partition may be performed by being included in the step of performing the outer permutation in step S800, or the step of distributing the sub-band PRUs or the mini-band PRUs may be performed independently. In case the corresponding step is performed independently, the corresponding step may be performed based upon frequency partition information that is being broadcasted through the super frame header or may be performed based upon a separate distribution rule.

Furthermore, in order to acquire a diversity gain for the distributed resource, inner permutation may be additionally performed (S820). Herein, the step of performing the inner permutation is performed in units of subcarrier pairs, and this process may be referred to as subcarrier permutation.

Meanwhile, subchannelization and subchannel rotation respective to when resource for a legacy system, e.g., the IEEE 802.16e system, and resource for the IEEE 802.16m system are frequency division multiplexed, and when, for example, the IEEE 802.16m system supports the FDM (Frequency Division Multiplexing) uplink PUSC region will hereinafter be described in detail.

Figure 9:
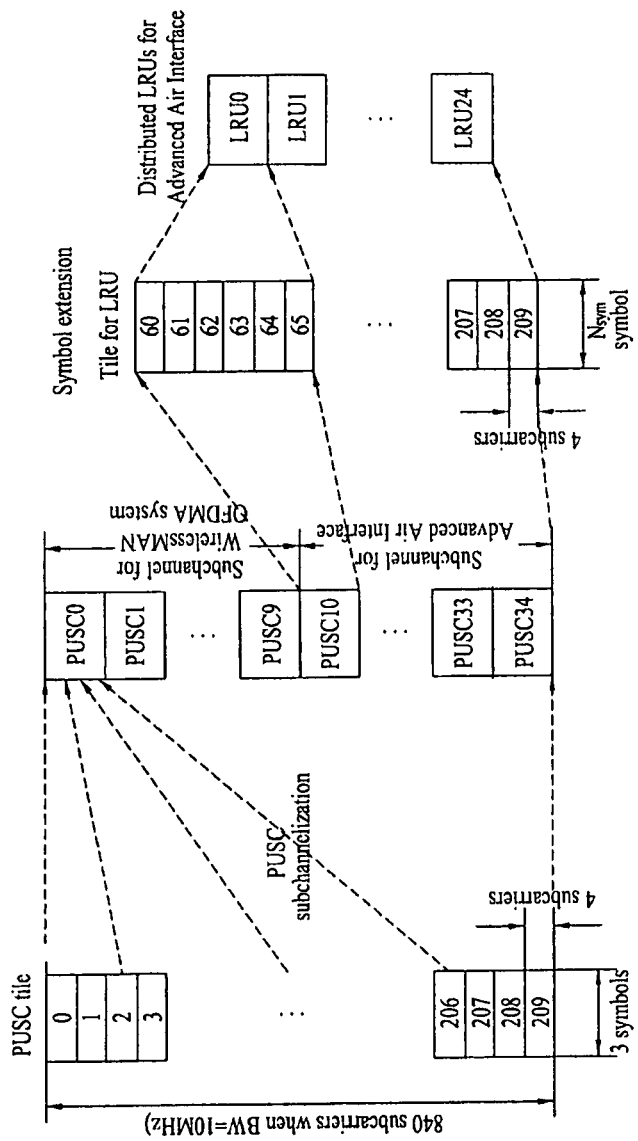
FIG. 9 illustrates an exemplary procedure for performing general subchannelization, when the IEEE 802.16m system supports an FDM (Frequency Division Multiplexing) based uplink PUSC region.

FIG. 9 illustrates an exemplary procedure for performing general subchannelization, when the IEEE 802.16m system supports an FDM (Frequency Division Multiplexing) based uplink PUSC region.

First of all, in order to support the bandwidth of an IEEE 802.16e system, i.e., the WirelessMAN-OFDMA system, all of the available subcarriers are divided into $N_{tiles}$ number of PUSC tiles, each being configured of 4 subcarriers×3 OFDM (A) symbols. Then, subchannelization for creating an uplink PUSC is performed by units of 6 PUSC tiles based upon a predetermined standard of the IEEE 802.16e system. FIG. 9 shows an example wherein 35 subchannels from index 0 to index 34 are configured, after being divided into a total of 210 PUSC tiles from index 0 to index 209. Herein, the rule for performing the subchannelization process corresponds to Equation 1 shown below.

$$\text{Tiles}(s,n) = N_{subchannels} \cdot n + (Pt|(s+n) \bmod N_{subchannels}| + UL\_PermBase) \bmod N_{subchannels} \quad \text{(Equation 1)}$$

As shown in Equation 1, $N_{subchannels}$ represents the total number of subchannels, and s indicates a subchannel index and has a value ranging from 0 to $N_{subchannels}-1$. Also, n represents a tile index included in a specific subchannel and has a value ranging from 0 to 5. Furthermore, Tiles(s,n) indicates a physical time index of a tile corresponding to index n, the tile being included in a subchannel corresponding to index s.

Meanwhile, in the process of performing subchannelization, a tile permutation process may be alternately performed. And, herein, Pt( ) represents a function for performing the tile permutation process, and UL_PermBase refers to an integer, which is assigned by a management entity as a factor that is required when performing tile permutation.

Thereafter, the subchannels for the IEEE 802.16m system are extended from 3 symbols to a subframe unit including $N_{sym}$ number of symbols along the time axis. Then, an indexing process is performed for the distributed logical resource unit. Herein, $N_{sym}$ is decided based upon the subframe type of the IEEE 802.16m system.

Meanwhile, the IEEE 802.16e system may apply the subchannel rotation method on subchannels, which are configured through the above-described subchannelization process. In the IEEE 802.16e system, subchannel rotation corresponds to a process of rotating subchannels in slot units each configured of 3 symbols and then having a user equipment, which is assigned with the same frequency band during a specific time section, perform rotation is slot units, thereby acquiring diversity gain and interference alleviation.

The subchannel rotation method is applied to all of the assigned uplink subchannels except for cases wherein an UIUC (uplink interval usage code) included in an uplink map is equal to 0, 12, and 13, and a case wherein the UIUC is equal to 11 and the subchannel corresponds to type 8. Table 2 and Table 3 shown below respectively indicate UIUC values defined in the IEEE 802.16e and the usage of the UIUC. Most particularly, when the UIUC value is equal to 11, this indicates an Extended UIUC 2 IE, and, in this case, Table 3 shows the Extended UIUC 2 IE.

TABLE 2

| UIUC | Usage |
|---|---|
| 0 | Fast-feedback Channel |
| 1-10 | Different burst profiles (Data Grant Burst Type) |
| 11 | Extended UIUC 2 IE |
| 12 | CDMA BR CDMA ranging |
| 13 | PAPR reduction allocation, safety zone, Sounding Zone |
| 14 | CDMA Allocation IE |
| 15 | Extended UIUC |

TABLE 3

| Extended UIUC (hexadecimal) | Usage |
|---|---|
| 0x0 | Power Control IE |
| 0x1 | Reserved |
| 0x2 | AAS UL IE |
| 0x3 | CQICH Allocation IE |
| 0x4 | UL Zone IE |
| 0x5 | UL-MAP Physical Modifier IE |
| 0x6 | Reserved |
| 0x7 | UL-MAP Fast Tracking IE |
| 0x8 | UL PUSC Burst Allocation in Other Segment IE |
| 0x9 | Fast Ranging IE |
| 0xA | UL Allocation Start IE |
| 0xB . . . 0xF | Reserved |

More specifically, subchannels to which the subchannel rotation method is not applied may include a subchannel for a Fast-feedback channel, wherein UIUC=0, a subchannel for CDMA BR (Bandwidth Requesting) or CDMA ranging, wherein UIUC=12, and a subchannel for PAPR reduction, a safety zone (or area or region), and a sounding zone (or area or region), wherein UIUC=13, and may also include a subchannel wherein the extended UIUC is equal to 0×8, when UIUC=11.

Thereafter, by using a random function f, the subchannels having the subchannel rotation method applied thereto may be newly assigned with contiguous indexes starting from 0 in accordance with Equation 2 shown below. Accordingly, the subchannel rotation process may be performed in accordance with Equation 3. In this case, $N_{subchan}$ indicates the total number of subchannels having subchannel rotation applied thereto.

$$\text{temp1\_subchannel\_number} = f(\text{old\_subchannel\_number}) \quad \text{[Equation 2]}$$

$$\text{temp2\_subchannel\_number} = (\text{temp1\_subchannel\_number} + 13 \times S_{idx}) \bmod N_{subchan} \quad \text{[Equation 3]}$$

The above-described subchannel rotation process is performed in slot units, and, in Equation 3, $S_{idx}$ indicates a slot index configured of 3 symbols. Therefore, the first slot is assigned with 0, and the values assigned to the subsequent slots are incremented by 1.

The physical index of a subchannel having subchannel rotation applied thereto is expressed in accordance with Equation 4 shown below. And, $f^{-1}$ of Equation 4 indicates an inverse function of f shown in Equation 2.

$$\text{new\_subchannel\_number} = f^{-1}(\text{temp2\_subchannel\_number}) \quad \text{[Equation 4]}$$

Meanwhile, in the IEEE 802.16e system, the subchannel rotation process is performed in slot units, i.e., in units of 3 symbols. And, in the IEEE 802.16m system, since the signal transmission unit is configured of 6 symbols or 9 symbols as a subframe, when the resource for the IEEE 802.16e system and the resource for the IEEE 802.16m system are frequency division multiplexed, the issue of whether to apply subchannel rotation to the resource for the IEEE 802.16m system as well or whether to apply subchannel rotation only to the resource for the IEEE 802.16m system may also be a problem.

In order to resolve the above-described problem, the description of the present invention will propose a solution with respect to two different cases: 1) one being a case of applying the subchannel rotation method to subchannels for both systems, and 2) the other being a case of applying the subchannel rotation method only to subchannels for the IEEE 802.16e system. Hereinafter, the IEEE 802.16e system may also be referred to as a legacy system, and the user equipment of the IEEE 802.16e system may also be referred to as a legacy user equipment for simplicity.

<When Subchannel Rotation is Applied to Subchannels for Both Systems>

Conventionally, subchannel rotation is basically applied to subchannels for the IEEE 802.16e system. However, by principle, subchannel rotation is not applied to subchannels for the IEEE 802.16m system. In such case, in order to apply subchannel rotation to the subchannels for the IEEE 802.16m system as well, a separate signaling for a user equipment (or AMS (Advanced Mobile Station)) of the IEEE 802.16m system is required.

Therefore, the base station may add information on whether or not the subchannel rotation is being applied to the user equipment of the IEEE 802.16m system to a flag information having the size of 1 bit, thereby signaling the corresponding information. For example, the corresponding information may be indicated by a S-SFH (Secondary-Super Frame Header) or may be signaled through broadcasting of a MAC control message.

As a method of performing subchannel rotation for the IEEE 802.16m system, a method of adopting the conventional rules without any modification and a method of adopting a renewed (or corrected or amended) version of the conventional rule may be taken into consideration.

First of all, the method of adopting the conventional rules without any modification will now be described in detail. The user equipment of the IEEE 802.16m system performs subchannel rotation in slot units, wherein each slot is configured of symbols, in a subframe configured of 6 symbols. More specifically, the subchannel rotation process may directly use the conventional rules of the IEEE 802.16e system without any modification, as shown in Equation 3. In this case, the $N_{subchannel}$ of Equation 2 is applied as a total number of subchannels that can be used by the IEEE 802.16e system And the IEEE 802.16m system (e.g., when the system bandwidth is 10 MHz, $N_{subchannel}=35$).

Meanwhile, as described above, in the IEEE 802.16e system, subchannel rotation is performed in slot units, i.e., in 3-symbol units. However, in the IEEE 802.16m system, since the signal transmission unit corresponds to 6 symbol units or 9 symbol unit as a subframe, the pilot pattern is also defined in subframe units. In this case, if the slot-unit subframe rotation process is directly applied without modification, the performance of IEEE 802.16m system may be degraded.

Therefore, it is preferable to exclude the subchannel for an uplink control channel or a ranging channel, which may cause critical degrading in the system performance when performing the slot-unit subchannel rotation process, and to apply PUSC permutation only on the remaining subchannels. For example, the position of the uplink control channel or ranging channel may be fixed to an LRU of the lowest index (or the highest index), and PUSC permutation may be performed only on the remaining regions.

Next, the method of adopting a renewed (or corrected or amended) version of the conventional rule will now be described in detail. More specifically, the present invention proposes that the subchannel rotation process for the IEEE 802.16m system should be applied in subframe units.

At this point, the user equipment (R1 MS) of the IEEE 802.16e system performs subchannel rotation within the assigned (or allocated) subchannel in slot units, and the user equipment (AMS) of the IEEE 802.16m system performs subchannel rotation only within the subchannel (or DLRU) assigned (or allocated) to the AMS in subframe units. The subchannel rotation rule for the AMS may be expressed as shown in Equation 4 below.

$$\text{temp2\_subchannel\_number} = (\text{temp1\_subchannel\_number} + 13 * S_k) \bmod N_{subchannel\ for\ 16m\ AMS} \quad \text{[Equation 4]}$$

Equation 4 corresponds to a modified version of Equation 3, wherein $S_{idx}$ indicating the slot index is changed to $S_k$ indicating a subframe index, and wherein $N_{subchan}$ is $N_{subchannel\ for\ 16m\ AMS}$.

For example, since a Type-1 subframe is configured of 6 symbols, the value of $S_k$ may be the equivalent of the value of $S_{idx}$ being maintained during a period of 2 slots (i.e., 6 symbols). Also, since a Type-4 subframe is configured of 9 symbols, the value of $S_k$ may be the equivalent of the value of $S_{idx}$ being maintained during a period of 3 slots (i.e., 9 symbols). In Equation 4, $N_{subchannel\ for\ 16m\ AMS}$ represents the number of subchannels allocated (or assigned) to the AMS, and, for the application of the subchannel rotation process, the $N_{subchannel\ for\ 16m\ AMS}$ may be indicated to the AMS through an SFH or MAC control message.

<When Subchannel Rotation is Applied Only to a Subchannel the IEEE 802.16e System>

When the subchannel rotation method is applied only to a subchannel for the IEEE 802.16e system in an FDM (Frequency Division Multiplexing) uplink PUSC resource area, the conventional subchannel rotation rule is required to be corrected and modified.

First of all, a method of correcting the already-existing Equation 3 to Equation 6 shown below may be taken into consideration. More specifically, in case the $N_{subchan}$ of Equation 3 is maintained without any modification, the $N_{subchan}$ value may be applied as the sum of the number of subchannels for the IEEE 802.16e system and the number of subchannels for the IEEE 802.16m system. Therefore, in order to avoid applying the subchannel rotation to the subchannels for the IEEE 802.16m system, the base station may transmit information associated with the allocated subchannel in a bitmap formation (UL allocated subchannels bitmap) to the user equipment of the IEEE 802.16e system through a UCD (Uplink Channel Descriptor) message. And, accordingly, the conventional Equation 3 is required to be corrected and modified to Equation 6 as shown below.

temp2_subchannel_number=
  (temp1_subchannel_number+13$S_{idx}$)mod
  $N_{subchannel\ for\ 16eMS}$  [Equation 6]

In Equation 6, $N_{subchannel\ for\ 16e\ MS\ parameter}$ represents a number of subchannels for the IEEE 802.16e system, and the $N_{subchannel\ for\ 16e\ MS\ parameter}$ may be signaled to the user equipment of the IEEE 802.16e system through a UCD (Uplink Channel Descriptor) message or through another control channel. The user equipment of the IEEE 802.16m system, i.e., the AMS does not adopt the subchannel rotation, and since the base station allocates a sufficient number of subchannel, excluding $N_{subchannel\ for\ 16e\ MS\ parameter}$ number of subchannels from the overall subchannels, a separate signaling process is not required.

For example, referring to FIG. 9, the subchannel rotation is applied to subchannels of index 0 to index 9 for the IEEE 802.16e system, and resource allocation may be directly performed on the subchannels of index 10 to index 34 for the IEEE 802.16m system without applying subchannel rotation.

Next, a method of maintaining Equation 3 without any modification, yet adding more subchannels for the IEEE 802.16m system to areas (or zones) wherein subchannel rotation is not applied may be taken into consideration. As described above, the current subchannel rotation method is applied to all uplink subchannels except for when the UIUC (uplink interval usage code) is equal to 0, 12, and 13, and also except for type 8 of the extended UIUC, when the UIUC is equal to 11.

Herein, the case where the UIUC is equal to 13 indicates that the subchannel corresponds to a subchannel for PAPR reduction, a subchannel for a safety zone, or a subchannel for a sounding zone (or area). Meanwhile, the subchannel for a safety zone uses a garbage subcarrier so as to designate an area (or zone) having no data transmitted thereto.

Therefore, the present invention proposes a method of including the subchannels for the IEEE 802.16m system to the subchannel for the safety zone. More specifically, in case the IEEE 802.16m system supports an FDM based uplink PUSC area (or zone), the base station (ABS) transmits information indicating that the subchannel for the IEEE 802.16e system is included in the a safety zone designated by UIUC=13 to the user equipment of the IEEE 802.16e system. And, then, among the subchannel being applied during the subchannel rotation, the user equipment (R1 MS) of the IEEE 802.16e system excludes the subchannel for the safety zone designated the UIUC having the value of 13, i.e., the subchannel for the IEEE 802.16m system.

Finally, in case a resource for the IEEE 802.16e system and the resource for the IEEE 802.16m system are frequency division multiplexed, a method of not applying subchannel rotation may also be taken into consideration.

Figure 10:
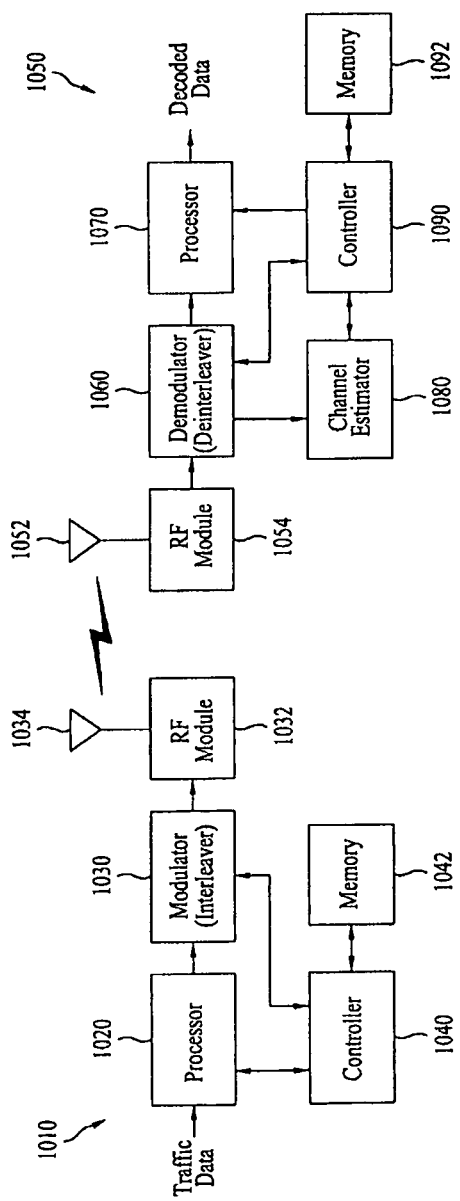
FIG. 10 illustrates a block view showing the structure of a transmitter and a receiver according to an embodiment of the present invention.

The user equipment, i.e., AMS of the IEEE 802.16m system does not apply subchannel rotation. Moreover, since the AMS is aware of the settings for the FDM based uplink PUSC area, additional signaling is not required. However, the user equipment of the IEEE 802.16e system may signal information indicating that subchannel rotation is not applied when supporting the FDM based uplink PUSC area, FIG. 10 illustrates a block view showing the structure of a transmitter and a receiver according to an embodiment of the present invention. In a downlink, a transmitter (1010) corresponds to a portion of the base station, and a receiver (1050) corresponds to a portion of the user equipment. In an uplink, a transmitter (1010) corresponds to a portion of the user equipment, and a receiver (1050) corresponds to a portion of the base station.

In the transmitter (1010), a processor (1020) creates data symbols by performing encoding, interleaving, and symbol mapping on data (e.g., traffic data and signaling). Also, the processor (1020) creates pilot symbols so as to multiplex the data symbols and the pilot symbols.

A modulator (1030) creates transmission symbols in accordance with the wireless access method. The wireless access method includes FDMA, TDMA, CDMA, SC-FDMA, MC-FDMA, OFDMA, or a combination of two or more of the above. Also, the modulator (1030) uses diverse permutation methods presented in the embodiment of the present invention, so that data can be distributed in the frequency domain and be transmitted. A Radio Frequency (RF) module (1032) processes (e.g., performs analog conversion, amplification, filtering, and frequency uplink conversion on) the transmission symbols, so as to create an RF signal, which is transmitted through an antenna (1034).

In the receiver (1050), the antenna (1052) receives the signal transmitted from the transmitter (1010) and provides the received signal to the RF module (1054). The RF module (1054) processes (e.g., performs filtering, amplification, frequency downlink conversion, and digitalization on) the received signal RF, so as to provide input samples.

A demodulator (1060) demodulates the input samples so as to provide data values and pilot values. A channel estimator (1080) estimates a channel estimation value based upon the received pilot values. Also, the demodulator (1060) performs inverse operations of diverse permutation methods proposed in the embodiment of the present invention, thereby being capable of realigning data distributed in the frequency domain and the time domain to the initial order. A processor (1070) performs symbol de-mapping, deinterleaving, and decoding on the data symbol estimation values, so as to provide decoded data.

Generally, the data processing performed by the demodulator (1060) and the processor (1070) of the receiver (1050) and the data processing performing by the modulator (1030) and the processor (1020) of the transmitter (1010) may complement one another.

Controllers (1040 and 1090) respectively supervise and control the operations of diverse processing modules existing in the transmitter (1010) and the receiver (1050). Memories (1042 and 1092) respectively store (or save) program codes and data for the transmitter (1010) and the receiver (1050).

The modules presented in FIG. 10 are merely examples presented to facilitate the description of the present invention. Therefore, the transmitter and/or the receiver may additionally include other modules whenever required, and some of the modules/functions may be omitted or further divided into separate modules. Alternatively, two or more modules may also be integrated to a single module.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the description of the present invention, the embodiments of the present invention have been described by mainly focusing on the data transmission and reception relation between the base station and the terminal (or user equipment). Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), and so on.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

The present invention may be applied to a wireless communication system. More specifically, the present invention may be applied to a wireless mobile communication device used for a cellular system.

The invention claimed is:

1. A method for configuring subchannels for an uplink data transmission at a base station in a wireless communication system, the method comprising;
dividing an uplink transmission resource to PUSC (Partial Usage of SubChannel) tiles of 4 subcarriers×3 symbols;
configuring sub channels to 6 PUSC tiles based on a predetermined rule;
allocating a predetermined number of contiguous subchannels among the configured subchannels as subchannels for a legacy system, and
allocating the remaining subchannels as subchannels for the wireless communication system,
wherein subchannel rotation per slot consisting of 3 symbols is applied to the subchannels for the legacy system,
wherein a subchannel rotation per subframe consisting of 6 symbols or 9 symbols is applied to the subchannels for the wireless communication system,
wherein the subchannel rotation per slot is performed in accordance with Equation 1, $$\text{temp2\_subchannel\_number} = (\text{temp1\_subchannel\_number} + 13 * S_{idx}) \mod N_{subchannel\ for\ 16e\ MS}, \quad \text{<Equation 1>}$$

wherein, temp2_subchannel represents a subchannel index after the subchannel rotation is applied, temp1_subchannel represents a subchannel index before the subchannel rotation is applied, $S_{idx}$ represents a slot index, and $N_{subchannel\ for\ 16e\ MS}$ represents a number of subchannels for the legacy system,
wherein the subchannel rotation per subframe is performed in accordance with Equation 2, $$\text{temp2\_subchannel\_number} = (\text{temp1\_subchannel\_number} + 13 * S_k) \mod N_{subchannel\ for\ 16m\ AMS}, \text{ and} \quad \text{<Equation 2>}$$

wherein, temp2_subchannel represents a subchannel index after the subchannel rotation is applied, temp1_subchannel represents a subchannel index before the subchannel rotation is applied, $S_k$ represents a subframe index, and $N_{subchannel\ for\ 16m\ AMS}$ represents a number of subchannels for the wireless communication system.

2. The method of claim 1, wherein the number of subchannels for the legacy system is signaled to a legacy user equipment through a UCD (Uplink Channel Descriptor) message.

3. The method of claim 1, wherein the subchannels for the wireless communication system are signaled as zones to which the subchannel rotation per slot is not applied, to o legacy user equipment through a UIUC (uplink interval usage code) included in an uplink MAP.

4. The method of claim 1, wherein, whether the subchannel rotation per subframe is applied is signaled to a user equipment for wireless communication through a MAC (Media Access Control) message or indicated to the user equipment in a Secondary Superframe Heather (S-SFH).

5. A base station comprising:
a processor configured to allocated a resource for m uplink data transmission;
a transmitting module configured to transmit information on the allocated resource to a user equipment; and a receiving module configured to receive the uplink data from the user equipment through the allocated resource, wherein the processor is further configured to:
divide an uplink transmission resource to PUSC (Partial Usage of SubChannel) tiles of 4 subcarriers×3 symbols, configure subchannels to 6 PUSC tile based on a predetermined rule, allocate a predetermined number of contiguous subcbannels among the configured subchannels as subchannels for a legacy system, and allocate the remaining subchannels as subchannels for the wireless communication system, wherein a subchannel rotation per slot consisting of 3 symbols is applied to the subchannels for the legacy system, wherein a subchannel rotation per subframe consisting, of 6 symbols or 9 symbols is applied to the subchannels for the wireless communication system, wherein the subchannel rotation per slot is performed in accordance with Equation 1, $$\text{temp2\_subchannel\_number} = (\text{temp1\_subchannel\_number} + 13 * S_{idx}) \bmod N_{subchannel\ for\ 16e\ MS}, \quad <\text{Equation 1}>$$

wherein, temp2_subchannel represents a subchannel index after the subchannel rotation is applied temp1_subchannel represents a subchannel index before the subchannel rotation is applied, $S_{idx}$ represents a slot index, and $N_{subchannel\ for\ 16e\ MS}$ represents a number of subchannels for the legacy system, wherein the subchannel rotation per subframe is performed in accordance with Equation 2, $$\text{temp2\_subchannel\_number} = (\text{temp1\_subchannel\_number} + 13 * S_{k}) \bmod N_{subchannel\ for\ 16m\ AMS}, \text{ and} \quad <\text{Equation 2}>$$

wherein, temp2_subchannel represents a subchannel index after the subchannel rotation is applied, temp1_subchannel represents a subchannel index before the subchannel rotation is applied, $S_k$ represents a subframe index, and $N_{subchannel\ for\ 16m\ AMS}$ represents a number of subchannels for the wireless communication system.

6. The base station of claim 5, wherein the number of subchannels for the legacy system is signaled to a legacy user equipment through a UCD (Uplink Channel Descriptor) message.

7. The base station of claim 5, wherein the subchannels for the wireless communication system are signaled as zones, or areas, to which the subchannel rotation per slot is not applied, to a legacy user equipment through a UIUC (uplink interval usage code) included in an uplink MAP.

* * * * *